US008061471B2

(12) United States Patent
Wei

(10) Patent No.: US 8,061,471 B2
(45) Date of Patent: Nov. 22, 2011

(54) SEISMIC VIBRATOR CONTROLLED BY DIRECTLY DETECTING BASE PLATE MOTION

(75) Inventor: Zhouhong Wei, Sugar Land, TX (US)

(73) Assignee: Inova, Ltd., George Town, Grand Cayman (KY)

( * ) Notice: Subject to any disclaimer, the term of this patent is extended or adjusted under 35 U.S.C. 154(b) by 0 days.

(21) Appl. No.: 12/771,033

(22) Filed: Apr. 30, 2010

(65) Prior Publication Data

US 2010/0276224 A1 Nov. 4, 2010

Related U.S. Application Data

(60) Provisional application No. 61/174,786, filed on May 1, 2009.

(51) Int. Cl.
*G01V 1/04* (2006.01)
(52) U.S. Cl. ......... 181/121; 181/119; 181/120; 181/122
(58) Field of Classification Search .................. 181/119, 181/120, 121, 122
See application file for complete search history.

(56) References Cited

U.S. PATENT DOCUMENTS

| | | | | |
|---|---|---|---|---|
| 3,929,206 | A | * 12/1975 | Bedenbender et al. | ........ 181/114 |
| 4,718,049 | A | 1/1988 | Crowell et al. | |
| 4,721,181 | A | 1/1988 | Airhart et al. | |
| 4,750,157 | A | 6/1988 | Shei | |
| 4,771,858 | A | 9/1988 | Goodloe | |
| 4,804,062 | A | * 2/1989 | Airhart | .......................... 181/121 |
| 4,899,321 | A | 2/1990 | Solanki | |
| 4,930,113 | A | 5/1990 | Sallas | |
| 4,967,870 | A | * 11/1990 | Airhart | .......................... 181/121 |
| 4,980,874 | A | 12/1990 | Justice, Jr. | |
| 5,000,285 | A | 3/1991 | Airhart | |
| 5,005,665 | A | 4/1991 | Cheung | |
| 6,561,310 | B2 | 5/2003 | Hoover | |
| 6,612,396 | B1 | * 9/2003 | Chelminski et al. | ........... 181/113 |
| 7,628,248 | B2 | 12/2009 | Wei et al. | |
| 2005/0224279 | A1 | * 10/2005 | Gilmer et al. | .................. 181/121 |
| 2007/0205042 | A1 | * 9/2007 | Temple et al. | ................ 181/121 |
| 2007/0240930 | A1 | * 10/2007 | Wei et al. | ....................... 181/121 |
| 2007/0250269 | A1 | 10/2007 | Wei et al. | |
| 2010/0071989 | A1 | 3/2010 | Wei et al. | |

OTHER PUBLICATIONS

Lebedev, et al., "Radiation from flexural vibrations of the baseplate and their effect on the accuracy of traveltime measurements," Geophysical Prospecting, 53, pp. 543-555 (2005). Wei, Zhouhong, "Pushing the vibrator envelope: extending low and high frequency limits," First Break, vol. 26, Mar. 2008.
International Search Report dated Jul. 12, 2010.
Written Opinion dated Jul. 12, 2010.
Lebedev, A. and Beresnev, I. "Radiation from flexural vibrations of the baseplate and their effect on the accuracy of traveltime measurements." Geophysical Prospecting, 2005 vol. 53, pp. 543-555 [retrieved on Jun. 16, 2010], retreived from the internet: <URL: http://www.geat.iastate.edu/Beresnev/lebedev_beresnev_flexure. pdf> Fig. 7 and p. 543, col. 1, para (2) to p. 544, col. 2 para (2) and p. 551, col. 1, para (1).

* cited by examiner

*Primary Examiner* — Forrest M Phillips
(74) *Attorney, Agent, or Firm* — Wong, Cabello, Lutsch, Rutherford & Brucculeri, LLP

(57) ABSTRACT

A seismic vibrator has a base plate with at least four isolators isolating a frame from the base plate. Each of these isolators is offset from the plate's footprint on shelves to free up area on the plate's top surface. An accelerometer disposed directly on the base plate detects the acceleration imparted to the plate. To reduce flexing and bending, the plate has an increased stiffness and approximately the same mass of a plate for a comparably rated vibrator. The accelerometer disposes at a particular location of the plate that experiences transition between longitudinal flexing along the plate's length. This transition location better represents the actual acceleration of the plate during vibration and avoids overly increased and decreased acceleration readings that would be obtained from other locations on the plate.

23 Claims, 12 Drawing Sheets

SEISMIC VIBRATOR CONTROLLED BY DIRECTLY DETECTING BASE PLATE MOTION

CROSS-REFERENCE TO RELATED APPLICATIONS

This is a non-provisional of U.S. Provisional Appl. Ser. No. 61/174,786, filed 1 May 2009, which is incorporated herein by reference in its entirety and to which priority is claimed.

BACKGROUND

In a geophysical survey, a seismic source can be carried by a truck and positioned at a predetermined location in an area of exploration. The seismic source can be a single axis vibratory source and can impart compressing P-waves into the earth once coupled to the earth and operated.

A vibrator 10 according to the prior art is illustrated in FIGS. 1A-1C and is diagrammatically illustrated in FIG. 2. The vibrator 10 transmits force to the ground using a base plate 20 and a reaction mass 50. As is typical, the vibrator 10 is mounted on a carrier vehicle (not shown) that uses a mechanism and bars 12/14 to lower the vibrator 10 to the ground. With the vibrator 10 lowered, the weight of the vehicle holds the base plate 20 engaged with the ground so seismic source signals can be transmitted into the earth.

The reaction mass 50 positions directly above base plate 20 and stilts 52 (FIG. 2) extend from the base plate 20 and through the mass 50 to stabilize it. Internally, the reaction mass 50 has a cylinder 56 formed therein. A vertically extending piston 60 extends through this cylinder 56, and a head 62 on the piston 60 divides the cylinder 56 into upper and lower chambers. The piston 60 connects at its lower end to a hub in a lower cross piece 54L and extends upward through cylinder 56. The piston 60's upper end connects to a hub on an upper cross piece 54U, and the cross pieces 54U-L connect to the stilts 52.

To isolate the base plate 20 from the bars 14, the bars 14 have feet 16 with isolators 40 disposed between the feet 16 and the base plate 20. As shown, three isolators 40 are disposed under each foot 16. In addition, the feet 16 have tension members 42 interconnected between the edges of the feet 16 and the base plate 20. The tension members 42 are used to hold the base plate 20 when the vibrator 10 is raised and lowered to the ground. Finally, shock absorbers 44 are also mounted between the bottom of the feet 16 and the base plate 20 to isolate vibrations therebetween.

FIGS. 3A-3C show the base plate 20 for the prior art vibrator 10 in plan, side, and end-sectional views. The top of the plate 20 has stilt mounts 24 for the stilts (52; FIG. 2), and a reinforcement pad 21 surrounds these mounts 24. Retaining ledges 26 are provided for the isolators (40). The long edges near the corners have forked hangers 28 to which ends of the tension members (42) connect, and reinforcement pads 27 are provided around the outside edges of the plate 20 for connecting the shock absorbers (44) to the base plate 20.

Overall, the base plate 20 can have a height $H_1$ of about 6.9-in., a width $W_1$ of about 42-in., and a length $L_1$ of about 96-in., and the plate 20 can weight approximately 4020-lbs. As shown in the end section of FIG. 3C, the plate 20 has four internal tubes or beams 30 that run longitudinally along the plate's length. The beams 30 are hollow tubes with rectangular cross-sections and have a height of about 6-in., a width of about 4-in., and a wall thickness of about ⅜-in. Interconnecting spacers 32 position between the beams 30 and between the long cap walls of the base plate 20.

During operation, a controller 80 as shown in FIG. 2 receives signals from a first sensor 85 coupled to the upper cross piece 54U and receives signals from a second sensor 87 coupled to the reaction mass 50. Based on feedback from these sensors 85/87 and a desired sweep signal for operating the vibrator 10, the controller 80 generates a drive signal to control a servo valve assembly 82. Driven by the drive signal, the servo valve assembly 82 alternatingly routes high pressure hydraulic fluid between a hydraulic fluid supply 84 and upper and lower cylinder piston chambers via ports in the mass 50. As hydraulic fluid alternatingly accumulates in the piston's chambers located immediately above and below the piston head 62, the reaction mass 50 reciprocally vibrates in a vertical direction on the piston 60. In turn, the force generated by the vibrating mass 50 transfers to the base plate 20 via the stilts 52 and the piston 60 so that the base plate 20 vibrates at a desired amplitude and frequency or sweep to generate a seismic source signal into the ground.

As the moving reaction mass 50 acts upon the base plate 20 to impart a seismic source signal into the earth, the signal travels through the earth, reflects at discontinuities and formations, and then travels toward the earth's surface. At the surface, an array of geophone receivers (not shown) coupled to the earth detects the reflected signal, and a recording device records the signals from the geophone receivers. The seismic recorder can use a correlation processor to correlate the computed ground force supplied by the seismic source to the seismic signals received by the geophone receivers. The seismic source has a hydraulic pump subsystem with hydraulic lines that carrying hydraulic fluid to the servo valve assembly 80, and a cooler may be present to cool the hydraulic subsystem.

When operating such a prior art vibrator 10, operators experience problems in accurately determining the ground force that the vibrator 10 is applying to the earth and in accurately correlating the vibrator's operation with the generated source signal. Ideally, operators would like to know the actual ground force applied by the base plate 20 to the ground when imparting the seismic energy. Unfortunately, the base plate 20 experiences a great deal of vibration and flexure that distorts readings that can be obtained from the base plate 20. Moreover, the isolators 40, shock absorbers 44, and other components required to isolate the base plate 20 from the supports 14 and feet 16 limit what free and unencumbered space is available on the base plate 20 to obtain acceleration readings.

For these reasons, a local sensor (e.g., accelerometer or geophone) is typically positioned on the upper cross piece 54U of the vibrator 50, which positions above the reaction mass 50 as best shown in FIG. 1C. Affixed at a location 55 on the upper cross piece 54U, the accelerometer (85; FIG. 2) couples to the base plate 20 via the stilts 52. In this location on the upper cross piece 54U, the accelerometer (85) can avoid the flexure, undesirable noise, distortion, and the like that occurs at the base plate 20, while still measuring acceleration for the base plate 20. For this reason, typical work in the prior art to improve performance of such a vibrator 10 has focused on optimizing the location of the local sensor (85) on the upper cross piece 54U to avoid issues with noise, flexure, and other problems.

In operation, the controller 80 shown in FIG. 2 measures the signal imparted into the earth using the local sensor 85 located on the upper cross piece 54U and the sensor 87 located on the reaction mass 50. The measured signals are transmitted to a correlation processor, which also receives the signals from geophones or other sensors making up the seismic spread. The correlation processor uses various algorithms to distinguish wave signal data from distortions and other spurious signals. A problem with this method is that the original source signal distortion may vary making correlation difficult. Thus, the cleaner the source signal imparted into the earth the easier the correlation at the recording end of the seismic acquisition process. Also, the more accurate the source signal is, the more energy the source vibrator 10 can impart to the earth.

Because the vibrator 10 works on the surface of the earth, which can vary dramatically from location to location due to the presence of sand, rock, vegetation, etc., the base plate 20 is often not evenly supported when deployed against the ground at a given location. In addition, the base plate 20 will flex and directly affect the control system during operation. As a result, the radiated energy produced can vary from location to location depending on where the vibrator 10 is deployed. Therefore, the vibrator's source signature is not the same (or nearly the same) from location to location and is not characteristically repeatable, which is desirable when performing seismic analysis.

When calculated ground force signals at the vibrator 10 are cross-correlated with far-field signals measured in the field, it has been recognized in the art that locating an accelerometer on a base plate can cause errors in the arrival time of the seismic waves. One theoretical approach proposed in the prior art for reducing the time shifts caused by the phase lag in the oscillations of the base plate 20 relative to the actuator force from the piston 60 suggests locating the accelerometer on the base plate at a radius that is approximately 68% of the plate's total radius. See A. Lebedev and I. Beresnev, "Radiation from flexural vibrations of the baseplate and their effect on the accuracy of traveltime measurements," *Geophysical Prospecting,* 2005, 53, 543-555. Yet, it has also been recognized that it may be practically difficult to find the exact location of the base plate for the accelerometer to improve the time shifts so that a more practical solution would be to modify the resonance of the base plate 20 so that problematic modes of this resonance would lie above an upper frequency of a sweep signal used during seismic survey. Although this approach may be affective, the subject matter of the present disclosure is directed to overcoming, or at least reducing the effects of, one or more of the problems set forth above.

SUMMARY

A seismic vibrator has a base plate having a top surface and a bottom surface. A frame supports the base plate so that the bottom surface can couple to the ground to impart vibrational energy for seismic surveying. An actuator moves a mass movably disposed above the base plate to impart vibrational energy to the base plate. This actuator can include a hydraulic actuator having a servo valve assembly that controls hydraulic fluid to a piston on which the mass positions. Alternatively, the actuator can include an electric motor, such as a linear motor. Using the hydraulic actuator, for example, stilts affixed to the base plate extending through the mass and support the mass on the base plate. A first cross piece supports one end of the piston to the stilts, and a second cross piece supports another end of the piston to the stilts.

The top surface of the base plate has areas unencumbered by components coupling the frame and stilts to the base plate. In particular, the base plate has at least four isolators isolating the frame from the base plate. Each of these isolators is disposed on shelves at corner locations of the base plate. These shelves are disposed offset from a footprint of the base plate so that the isolators do not encumber the top surface of the base plate.

A first sensor such as an accelerometer is disposed directly on the base plate and detects first signals indicative of acceleration imparted to the base plate. Similarly, a second sensor is disposed on the mass and detects second signals indicative of acceleration of the mass. The second signals from the second sensor tend to be reliable and accurately reflect the acceleration of the mass due to the size, mass value, and dimensions of the mass on which the second sensor is disposed.

The base plate, however, tends to experience a great deal of bending and flexing when it is coupled to the ground and vibration is imparted to it. For this reason, the base plate preferably has an increased stiffness. For example, the stiffness of the base plate can be approximately 2.5 times greater than the stiffness of a base plate of a comparably rated vibrator of the prior art. Yet, the mass of the base plate can be approximately the same as the mass of a base plate used on a comparably rated vibrator of the prior art. The increase in stiffness and comparable mass is achieved by increasing the height of longitudinal beams in the base plate and giving them a decreased wall thickness to reduce weight.

The increased stiffness of the base plate reduces the amount of flexing and bending that it experiences during operation, thereby making readings of its acceleration by the first sensor disposed directly thereon more reliable. However, to further improve the readings, the first sensor is disposed on a particular location of the base plate that experiences transition between longitudinal flexing during vibration. This transition location tends to better represent the actual acceleration of the base plate during vibration and avoids the overly increased and decreased acceleration readings that would be obtained from other locations on the base plate that experience flexing or bending during vibration.

A controller is communicatively coupled to the actuator and the first and second sensors. The controller controls operation of the actuator based at least in part on the first signals detected from the first sensor disposed directly on the base plate. For example, the controller computes a weighted-sum ground force using acceleration values of the first and second signals and using mass values of the mass and the base plate. Because the acceleration values from the base plate sensor are more accurate, the controller can avoid overestimating or underestimating the computed ground force during operation. This allows the controller to better control the vibrator and allows the vibrator to impart more energy into the ground in a way that better reflects the preferred reference or pilot signal configured to operate the vibrator for a seismic survey.

The foregoing summary is not intended to summarize each potential embodiment or every aspect of the present disclosure.

DETAILED DESCRIPTION

A. Assembly/General Operation

Figure 4A:
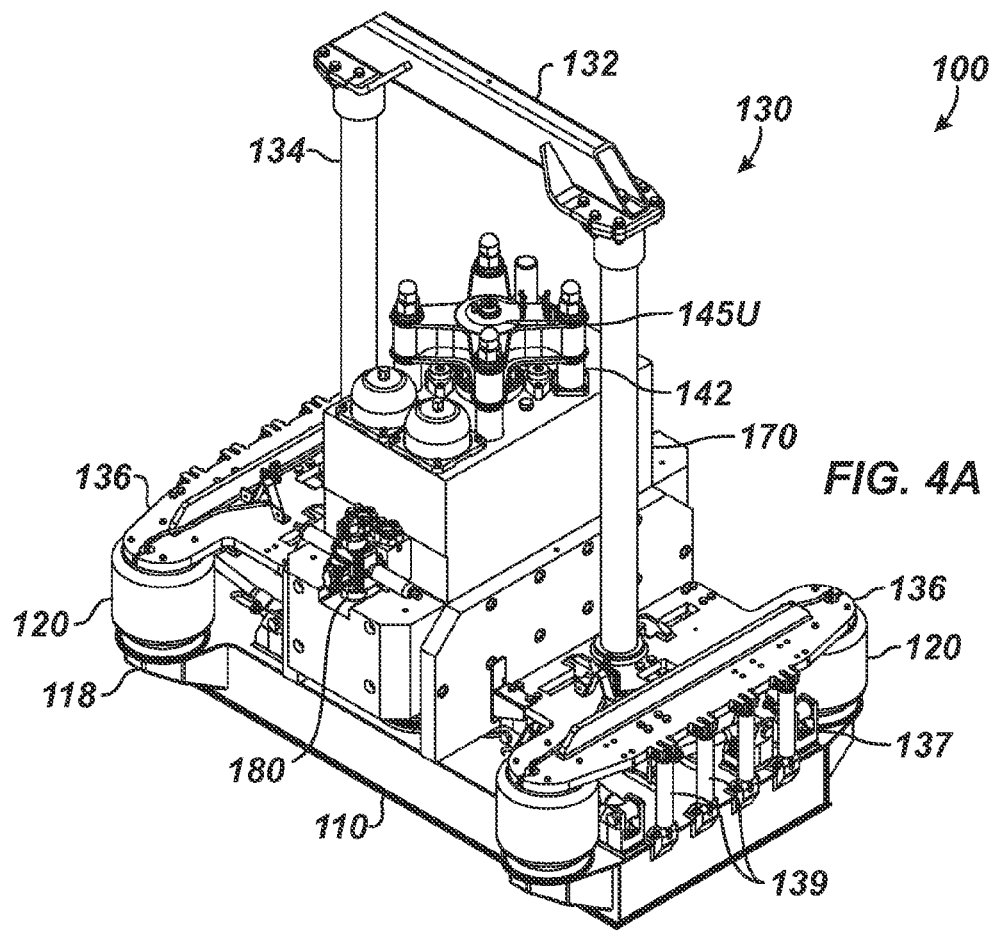
FIGS. 4A-4C show a vibrator according to certain teachings of the present disclosure in perspective, front, and top views.
Figure 4B:
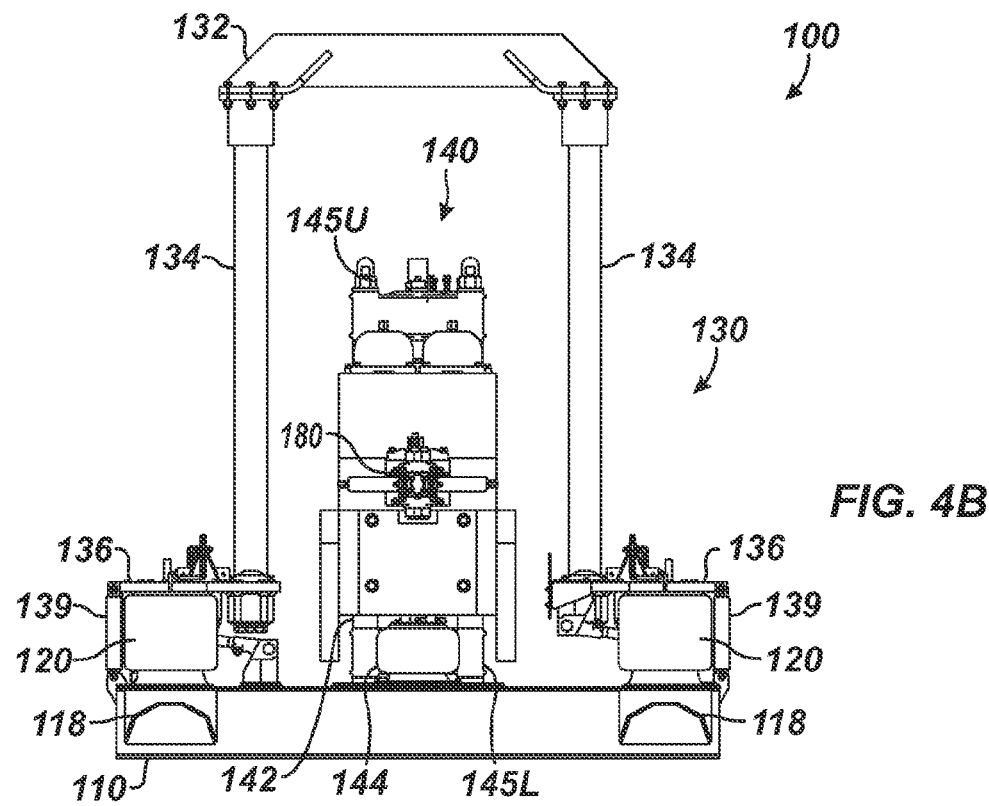
Figure 4C:
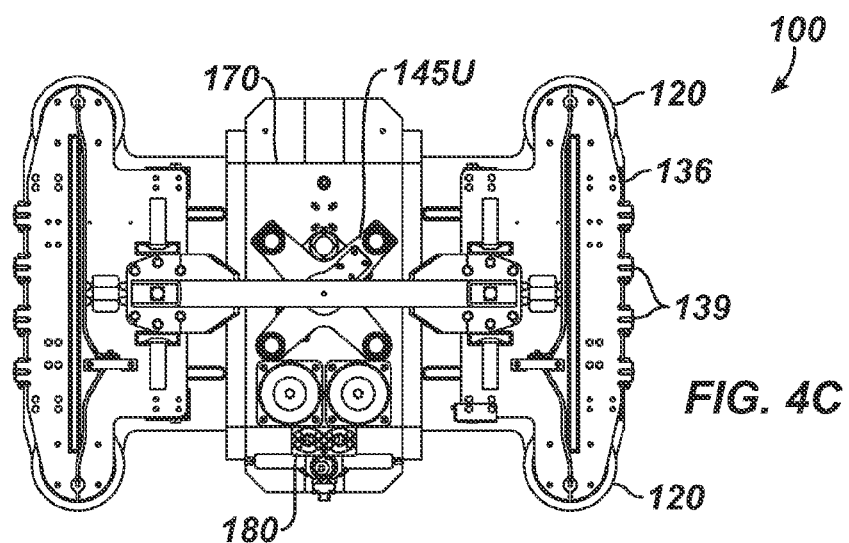

FIGS. 4A-4C shows perspective, front, and top views of a seismic vibrator 100 according to certain teachings of the present disclosure. The disclosed vibrator 100 is also shown schematically in FIG. 5. The vibrator 100 has a base plate 110, a frame 130, and a moveable reaction mass 170. The mass 170 and base plate 110 can be constructed mainly from a metal, such as steel or iron.

Vibrator 100 transmits force to the ground using the base plate 110 and reaction mass 170. As is typical, the vibrator 100 is mounted on a carrier or vehicle (not shown) that uses the frame 130 to lower the vibrator 100 to the ground. The vehicle can use a hydraulic, mechanical, or electromechanical mechanism to lower the vibrator 100 to the ground surface. With the vibrator 100 lowered, the weight of the vehicle holds the base plate 110 engaged with the ground so seismic source signals can be transmitted into the earth during operation. Other details of how the vibrator 100 couples to the earth with a vehicle or other carrier are well known in the art and not detailed herein.

The moving reaction mass 170 acts upon the base plate 110 to impart a seismic source signal into the earth. The seismic signal travels through the earth, reflects at discontinuities and formations, and travels toward the earth's surface. Sensors coupled to the earth are arranged in an array spaced apart from the vibrator 100. These sensors detect the reflected source signal, and a recording station typically housed in a truck record signals from the sensors. The recording station includes a seismic recorder and can also include a correlation processor. Such a correlation processor receives a signal from the vibrator 100 indicative of the actual source signal imparted into the earth and correlates the received signal with the recorded signals.

As shown in FIGS. 4A-4C, the reaction mass 170 positions directly above the base plate 110. A support 140 extends from the base plate 110 through the mass 170 and stabilizes the reaction mass 170. The support 140 is typically constructed using stilts 142, which can be tubular pipes or rods made of steel or the like. These stilts 142 have ends affixed to the base plate 110 and extend upward from the base plate 110 and through the reaction mass 170. An upper cross piece 145U, which may be constructed from steel or iron I-beam, couples to the top ends of the stilts 142 and provides stability to the support 140 as the mass 170 vibrates. Similarly, a lower cross piece 145L also couples to the stilts 142 below the mass 170. Isolators 144 are provided on the base plate 110 below the reaction mass 170.

Figure 5:
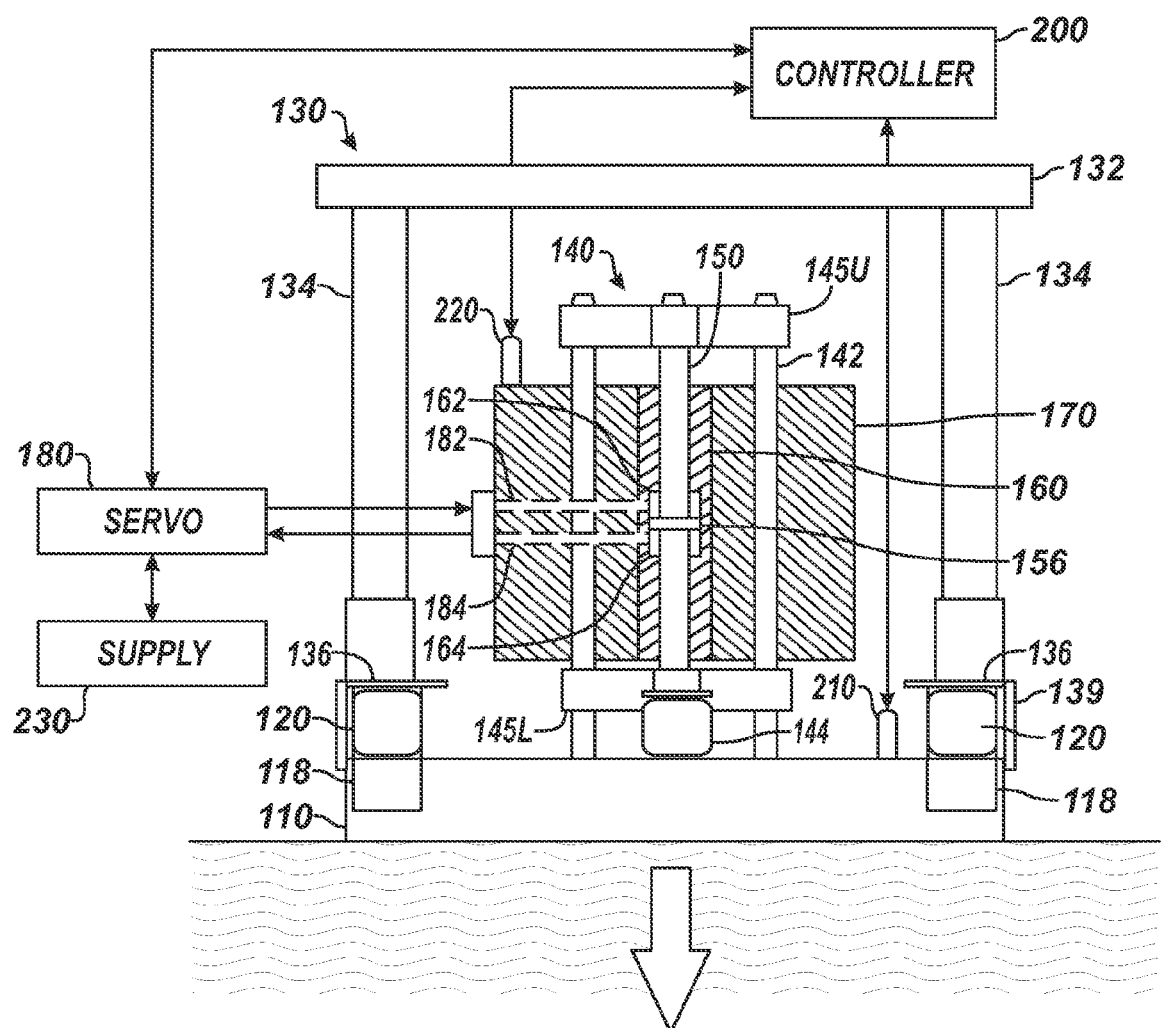
FIG. 5 schematically illustrates the vibrator of FIGS. 4A-4C.

As best shown in FIG. 5, the reaction mass 170 has a cylinder 160 formed internally therein that fits onto a vertically extending piston 150. The piston 150 connects at its lower end to a hub in the lower cross piece 145L and extends upward through cylinder 160. The piston's upper end connects to a hub in the upper cross piece 145U. A head 156 on the piston 150 divides the cylinder 160 into upper and lower chambers 162/164.

During operation, a controller 200 receives signals from a first sensor 210 coupled to the base plate 110 and a second sensor 220 coupled to the reaction mass 170. Additional sensors (not shown) may be coupled to the carrier vehicle (not shown) and to the ground. The local sensors 210/220 can include, but are not limited to, single or multiple axis accelerometers, geophones, micro electro-mechanical systems (MEMS) sensors, analog accelerometers with suitable ND conversion, or other suitable sensors. Based on feedback from these sensors 210/220 and a desired sweep signal used to operate the vibrator 100, the controller 200 generates a drive signal to control a servo valve assembly 180. The drive signal has characteristics of the desired sweep signal and is transmitted from the controller 200 to the valve's servo motor. In turn, the valve's motor operates a pilot valve in the servo valve assembly 180 coupled to a main stage valve in the assembly 180 that pressurizes and depressurizes hydraulic passages 182/184.

Driven by the controller 200, the valve 180 alternatingly routes high pressure hydraulic fluid between a hydraulic fluid supply 230 to the piston 150 via ports 182/184 in the mass 170. As hydraulic fluid alternatingly accumulates in the chambers 162/164 located immediately above and below the piston head 156, the reaction mass 170 reciprocally vibrates in a vertical direction on the piston 150. In turn, the force generated by the vibrating mass 170 transfers to the base plate 110 via the piston 150 and the support 140. Consequently, the base plate 110 vibrates at a desired amplitude and frequency to generate a seismic source signal into the ground.

To reduce acoustic noise once the reaction mass 170 and the base plate 110 are set in motion, the controller 200 can control the force and phase of the vibration using feedback from the sensor 210 on the base plate 110 and the sensor 220 on the reaction mass 170. Based on the sensor signals, the controller 200 can then estimate respective motions of the base plate 110 and mass 170 using a force and phase control algorithm. Based on the motions and the desired output of the vibrator 100, the controller 200 can then modify the control signal transmitted to the servo valve assembly 180 to regulate flow of the hydraulic fluid against the reaction mass 170 and, thereby, control the phase and frequency of the seismic signal produced.

Obtaining the best motion signals from the base plate 110 can improve the control of the vibrator 100 and the output of seismic energy into the ground. For this reason and as discussed below, the base plate 110 is preferably stiff and has increased mass. In addition, the sensor 210 is preferably affixed directly to the base plate 100 in an ideal location to achieve such a signal.

B. Isolation/Base Plate Structure

As noted above, the carrier vehicle applies its static weight to the base plate 110 via the frame 130 to hold the base plate 110 against the ground. Yet, the contribution of the frame 130 and vehicle to the resulting seismic force applied to the ground is preferably kept to a minimum by isolating motion of the base plate 110 from the frame 130 and vehicle using isolators 120.

As shown in FIGS. 4A-4C and 5, the frame 130 has vertical support bars 134 and a horizontal bar 132 connected to the tops of these vertical bars 134. At their distal ends, the vertical bars 134 connect to feet 136. In turn, these feet 136 connect to the base plate 110 using an arrangement of isolators 120, pivotable pistons 137, and tension members 139. The arrangement of these components (120, 137, & 139) essentially isolates the frame 130 from the base plate 110 and the movable mass 170 supported thereon. In addition, the arrangement allows the vibratory force of the mass 170 to be applied to the ground via the base plate 110 while minimizing the amount of force permitted to transmit through the frame 130 to the supporting vehicle.

Each vertical bar 134 couples to one of the feet 136. One end of four pistons 137 pivotably connect at each inner corner of these feet 136, while the other end of the pistons 137 pivotably connect to the base plate 110. The tension members 139 connect the outer edges of the feet 136 to the outer edge of the base plate 110 and support the plate 110 to the feet 136 when the vibrator 100 is lifted off the ground.

For their part, the isolators 120 can be air bags or other isolating elements known and used in the art. The isolators 120 are situated outside of the main footprint of the base plate 110. In particular, the outside corners of the feet 136 extend beyond the base plate's footprint. Similarly, shelves 118 on the base plate 110 extend from its edges to support the isolators 120 disposed between these shelves 118 and the extended corners of the feet 136. Use of the shelves 118 and other features between the frame 130 and base plate 110 creates a particularly useful amount of free space on the plate's surface.

Figure 6A:
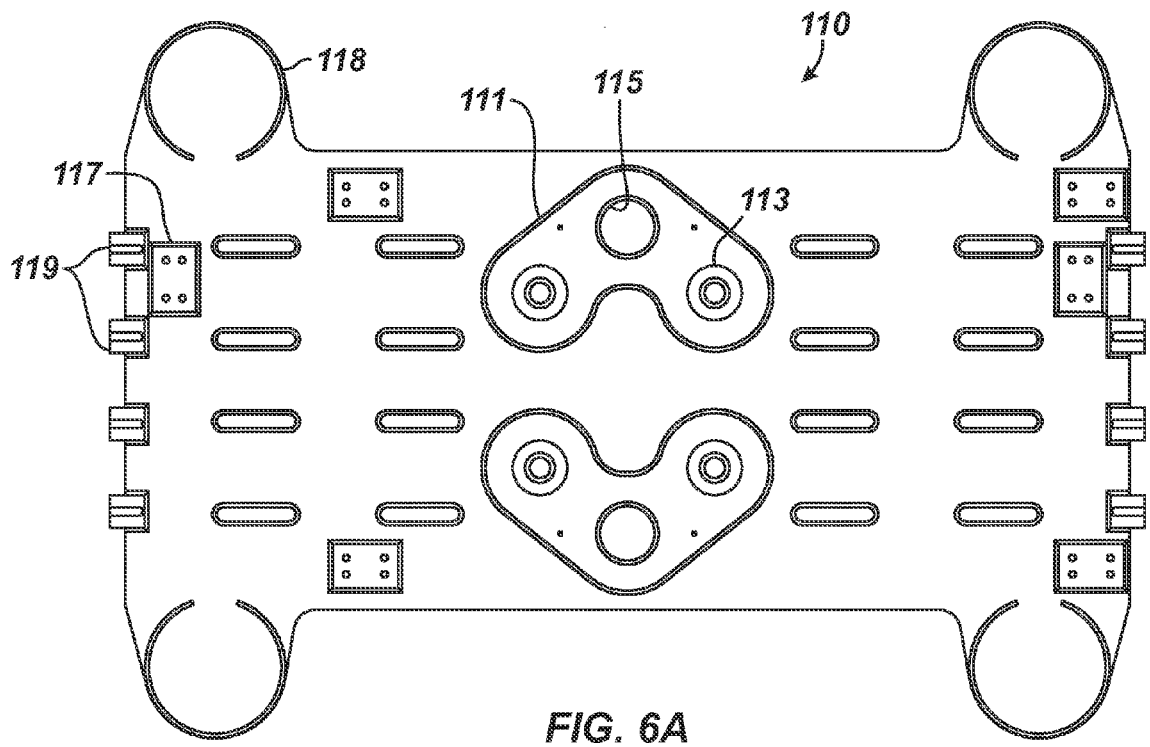
FIGS. 6A-6C illustrate the base plate for the disclosed vibrator in plan, side, and end-section views.
Figure 6B:
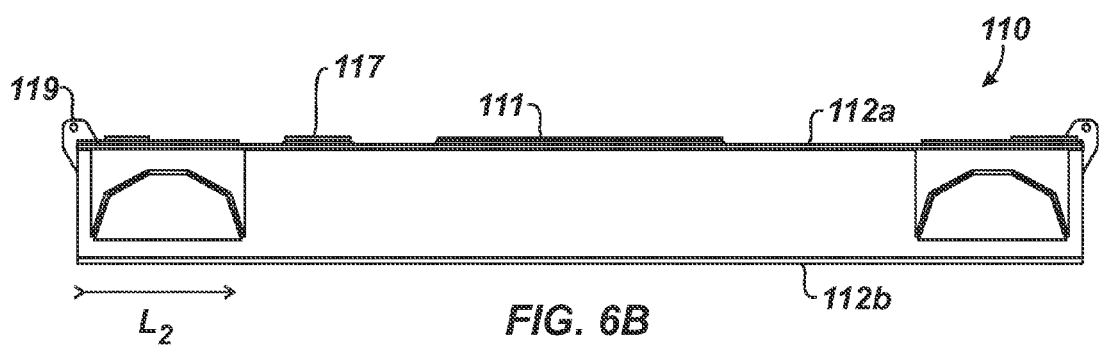
Figure 6C:
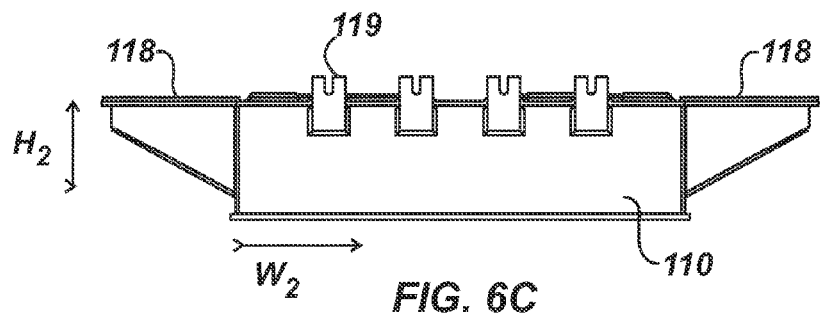

FIGS. 6A-6C show a plan view, a side view, and an end view of the base plate 110. As shown in FIGS. 6B-6C, the base plate 110 has a top surface 112a and a bottom surface 112b. As shown in FIG. 6A, stilt mounts 113 are exposed in the top surface 112a and are surrounded by reinforcement pads 111. Isolator mounts 115 in these pads 111 hold the isolators (144) that fit below the reaction mass (170). Corners of the top surface 112a extend out from the sides of the plate 110 and have retaining ledges for the isolators (120). The top surface's extending corners are supported by shelves 118 extending from the sidewalls of the base plate 110. The shorter edges of the base plate 110 have forked hangers 119 to which ends of the tension members (139) connect, and reinforcement pads 117 for connection of the pistons (137) are provided around the outside edges of the plate 110.

With the isolators (120) positioned on the shelves 118 off the main footprint of the base plate 110, the top surface 112a of the plate 110 has large expanses of free area on either side of the reinforcement pads 111, stilt mounts 113, and isolator mounts 115. These expanses remain exposed and unhindered by interconnecting or isolating components for the vibrator 100. In fact, the regions of the plate's top surface 112a free from coupling to support components and free from the footprint of the mass can define an area that is about ½ to ⅔ of the area of the plate's footprint on its bottom surface 112b.

As detailed below, such a free expanse on both sides of the vibrating mass (170) permits a local sensor, such as an accelerometer, to be particularly situated on the base plate 110 at an advantageous location to obtain the plate's motion during operation for use in computing the weighted-sum ground force.

Overall, the base plate 110 can have a height $H_2$ of about 10.87-in., a width $W_2$ of about 42-in., and a length $L_2$ of about 96-in. Additionally, the base plate 110 can weigh approximately 4345-lbs. in one implementation. Thus, the base plate 110 can have a weight approximately 1.08 times greater than the weight of the conventional prior art base plate so that the weight of the base plate 110 is relatively comparable to the weight of a base plate for a comparably rated vibrator used in the art. However, the base plate 110 can have a height that is approximately 4-in. (or 1⅔ times) greater than the height of the conventional prior art base plate so that it has a much greater stiffness.

Figure 7A:
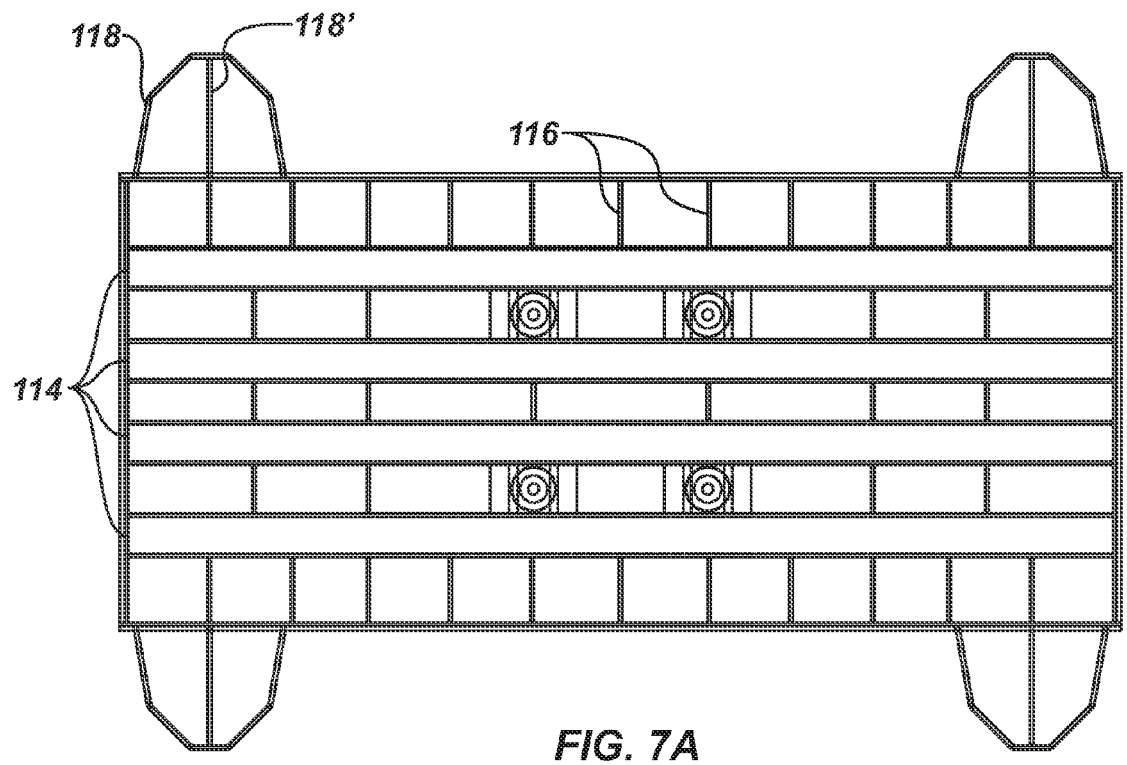
FIGS. 7A-7C illustrate the base plate for the disclosed vibrator in exposed views.
Figure 7B:
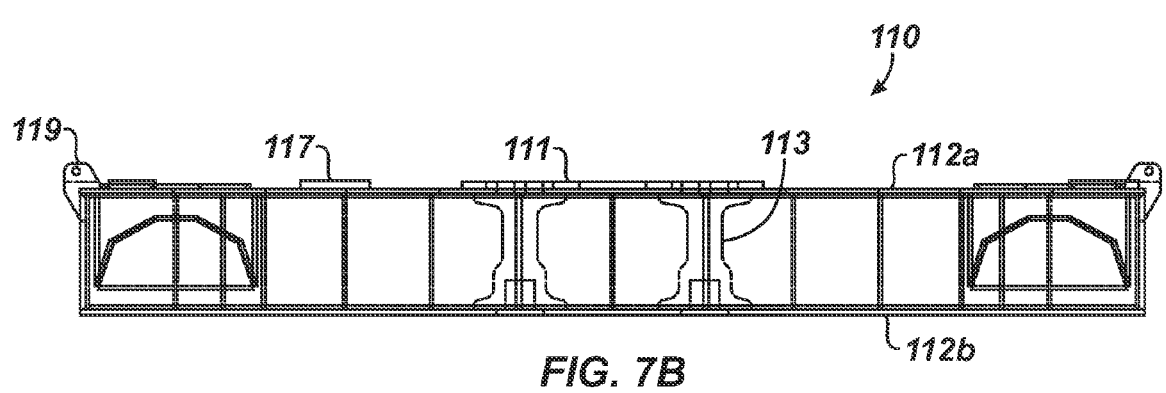
Figure 7C:
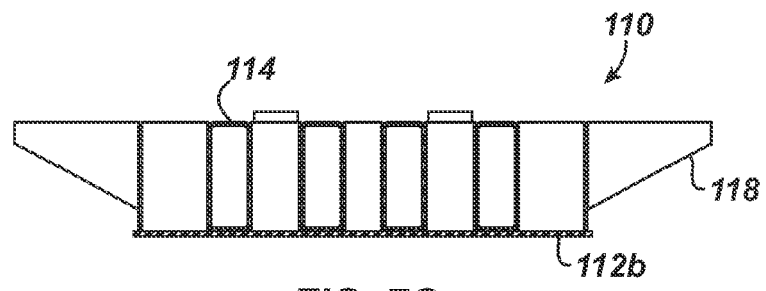

As implemented, the base plate 110 exhibits considerably more stiffness than the prior art base plate noted in the background section of the present disclosure. As shown in the exposed views of FIGS. 7A-7B, the plate 110 has four internal tubes or beams 114 that run longitudinally along the plate's length and has interconnecting spacers 116 positioned between the tubes 114 and between the long cap walls of the base plate 110. Gussets 118' and the isolator shelves 118 extend from the plate's long sidewalls, and the stilt mounts 113 position between pairs of beams 114. As best shown in the end section of FIG. 7C, the beams 114 are hollow tubes with rectangular cross-sections. To provide increased stiffness over prior art base plates, the beams 114 in the disclosed base plate 114 have a greater height, making the beams 114 about 10-in. in height. In other words, the height (about 10-in.) of each beam 114 is greater than 10% (and more particularly approximately 11%) of a length (about 92-in.) along which the beam 114 can bend during vibration.

The beams 114 also have a width of about 4-in. To maintain weight, the wall thickness of these beams 114 is preferably about 5⁄16-in. so that the base plate 110 will have a weight approximately the same as that used on a comparably rated vibrator in the art.

C. Location of Local Sensor on Base Plate

For best results when processing seismic source signals, operators preferably know what force the vibrator 100 has applied to the ground to generate the seismic source signals so that a correlation process can correlate the generated ground force with the data received by geophone receivers in the field. In reality, the true ground force that the vibrator 100 applies to the ground during operation may not be precisely known, and the ground force must instead be computed based at least in part on the masses and accelerations of the base plate 110 and reaction mass 170. Correlating the computed ground force with the received seismic signals uses known convolution techniques not described here.

The vibrator 100 of the present disclosure has several features that help to more accurately compute what force it applies to the ground during operation. As noted previously, the base plate 110 preferably has an increased thickness that increases the plate's stiffness. In one implementation, the base plate 110 has a thickness of approximately 10-in. This thickness produces a stiffness of approximately 2.5 times greater than the conventional stiffness used for comparable vibrators of the prior art that typically have a base plate thickness of about 6-in. The plate's increased stiffness reduces potential flexing of the base plate 110 that could produce undesirable readings by the base plate accelerometer 210 during operation. As is known, the base plate 110 can be operated on all kinds of ground surfaces, and the base plate 110 can undergo all kinds of unknown deflections. The stiffness reduces the potential deflection, making the deflection of the stiff base plate 110 more characterizable.

The plate's increased thickness likewise increases the plate's mass to some extent. Along the same lines, the mass value for the reaction mass 170 is also increased so that its mass is about 3 times the mass of the base plate 110, thereby increasing the mass ratio of the vibrator mass 170 to the base plate 110 from the conventional 2 times currently used on prior art vibrators. More precisely, the conventional mass ratio of a reaction mass to a base plate is about 2.02. In one implementation of the present vibrator 100, the preferred mass ratio between the base plate 110 and the reaction mass 170 is increased to 2.8 (i.e., about 3 times).

Finally, as noted above, the isolators 120 used to isolate the base plate 110 from the frame 130 are situated off the footprint of the base plate 110, freeing additional surface area on the base plate 110 for locating the accelerometer 210 and reducing interference from isolating components.

Locating the accelerometer 210 directly on the base plate 110 is done to obtain a more accurate or "true" reading for computing the ground force and to better control the vibrator 100's operation. Having more precise accelerometer readings of the base plate's motion, for example, the controller 200 can put higher frequency energy in to the ground, giving the seismic signals more bandwidth into the ground for seismic imaging. In other words, because the controller 200 uses standard weighted sum algorithms to control the vibration of the mass 170, knowing more precise motion of the base plate 110 allows the controller 200 to achieve greater energy efficiency.

A preferred or ideal location of the accelerometer 210 on the base plate 110 is determined using finite element analysis. In this analysis, a "sweet spot" or preferred location on the stiffened base plate 110 is determined where the base plate 110 would experience less undesirable flexure and noise during operation of the vibrator 100. The best locations for the accelerometer 210 would typically be situated where isolators are conventionally located on the prior art vibrator. Therefore, having the isolators 120 moved from conventional locations to corner locations off the plate's footprint as in the disclosed vibrator 100 makes more of the base plate's surface accessible for best locating the accelerometer 210.

Figure 8:
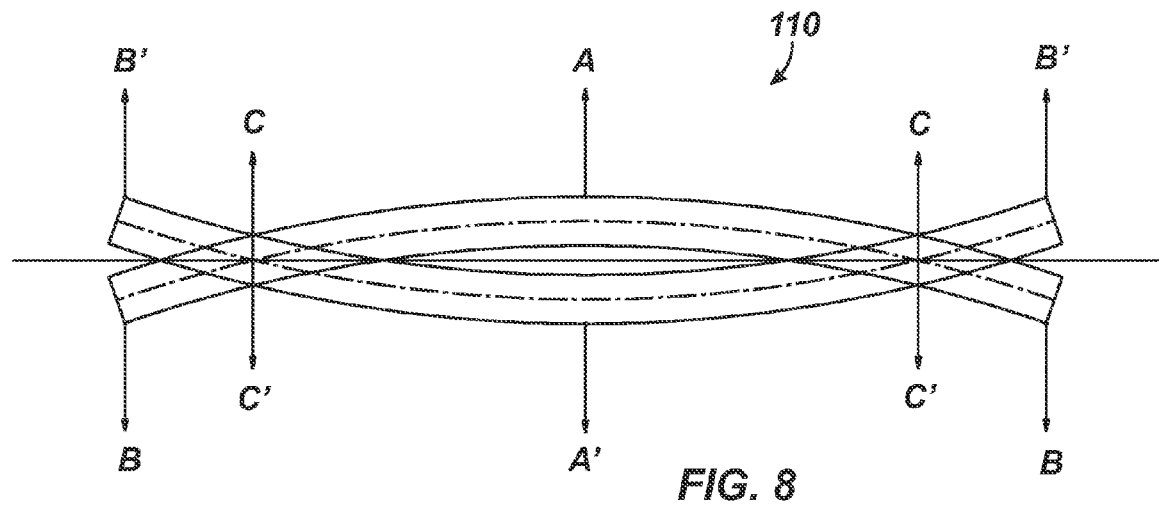
FIG. 8 diagrammatically illustrates bending experienced by the base plate during operation.

FIG. 8 diagrammatically illustrates bending movement experienced by the stiffened base plate 110 during operation. The base plate 110 is represented two-dimensionally along the plate's longitudinal axis. Because the plate 110 is three-dimensional and is vibrated against a surface such as the ground, the actual bending movement is more complex than illustrated, as one skilled in the art will appreciate. Finite Element analysis can be used to model the bending movement of the base plate 110. Being stiffened, the base plate 110, however, can be better modeled for finite element analysis due to more predictable motion. For all practical purposes, only longitudinal bending is of concern here, and lateral bending and twisting can be ignored.

During upward vibration, a center region A of the base plate 110 bends or flexes upwards when the entire plate 110 is translated upward, while edge regions B bend or flex downwards while also being translated upwards in the vibration. As a result, the center region A would experience increased acceleration over the acceleration induced by the base plate's translation, whereas the edge regions B would experience less acceleration. In downward vibration, the center region A' bends or flexes downwards when the entire plate 110 is translated downward and would experience increased acceleration. The edge regions B' would bend or flex upwards while also being translated downwards in the vibration and would experience less acceleration.

Regions C-C' on the plate 110, however, would be subject to less of the increased and decreased acceleration because these regions C-C' would represent areas on the plate 110 where the bending or flexure transitions during vibration. Therefore, regions C-C' would best reflect the base plate's acceleration when translated upward and downward because these regions C-C' avoid at least some of the acceleration changes caused by bending.

To locate the preferred location on the base plate 110, finite element analysis was performed on a model of the stiff base plate 110 to develop select locations for the accelerometer 210. Then, actual testing was performed by positioning an accelerometer 210 at a selected location on the base plate's top surface 112a. The plate 110 was then vibrated, and the ground force was measured with a load cell or other sensor for directly measuring the actual force. The reading from the positioned accelerometer 210 was used to calculate the weighted-sum ground force, which was then correlated with the actual force measured by the load cell. This was repeated with other locations for the accelerometer on the base plate 110. In the end, the testing verified the ideal or preferred spot on the base plate 110 for locating the accelerometer 210 that achieves the most accurate or "true" measure of the base plate's acceleration best correlated to the actual ground force measured during experimentation.

Figure 9:
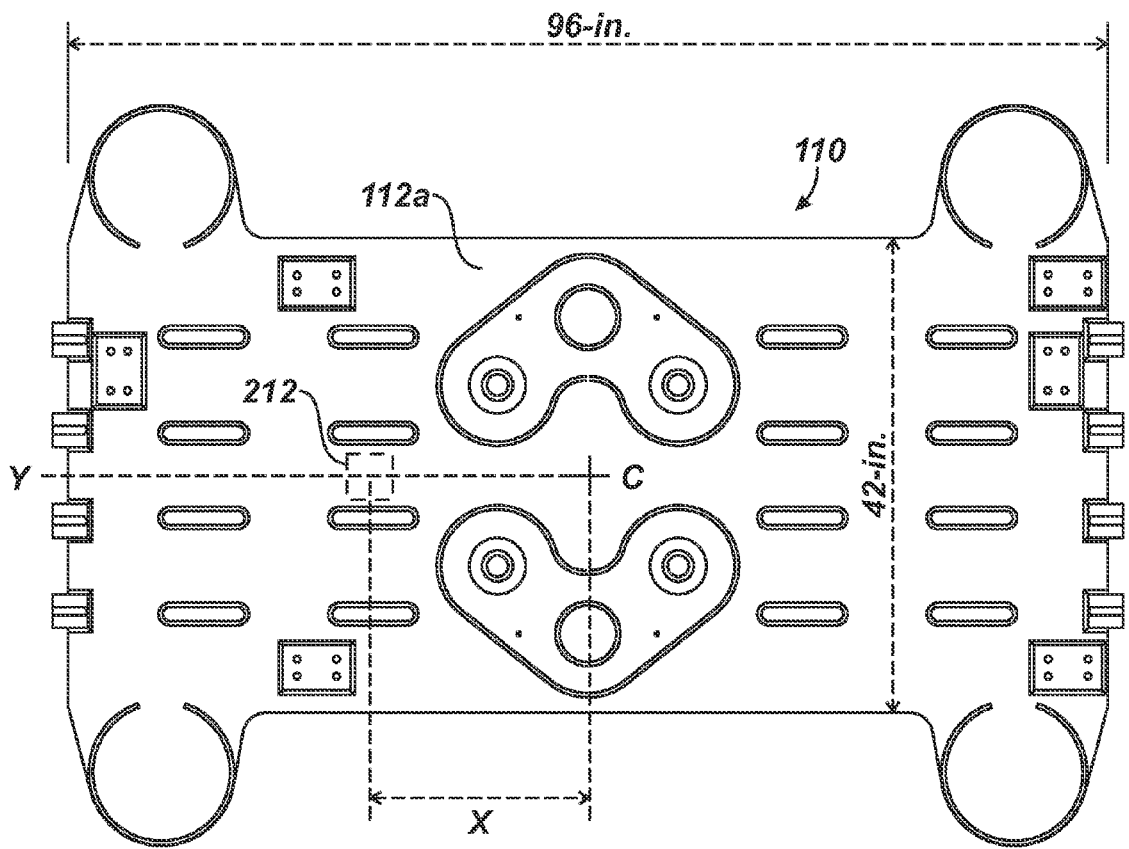
FIG. 9 is a plan view of the disclosed base plate showing a preferred location for an accelerometer to affix to the top surface.

In the plan view of FIG. 9, an ideal or preferred location 212 for the accelerometer 210 on the base plate 110 of the present disclosure is illustrated. Again, this base plate 110 has the dimensions of 10.87" (H)×42" (W)×96" (L) and a weight of 4345-lbs. Measuring from the center of the base plate 110, the preferred accelerometer location 212 is a longitudinal distance X of approximately 20-in. (±0.5-in.) from the center C along the length or longitudinal axis of the base plate 110. In addition, the preferred accelerometer location 212 is a lateral distance Y of approximately 0-in. (±0.5-in.) from the center along the width or lateral axis of the base plate 110. Thus, the preferred accelerometer location 212 lies along the plate's longitudinal axis, although the distance Y may actually be any value along the width of the base plate 110 as long as bending or twisting along the plate's lateral axis is negligible. In any event, the longitudinal distance X along the plate's longitudinal axis is approximately 41 to 43% of the plate's longitudinal distance from its center to a lateral edge (i.e., 48" which is half of the plate's total length of 96"). In other words, the longitudinal distance X of the location 212 is about 20% to 21% of the overall length of the base plate 110.

Of course, a reverse location on the other side of the base plate 110's center would also be preferred. Thus, one or more accelerometers may be positioned on the base plate 110 in one or both of these identified locations 212. A preferred accelerometer for affixing to the base plate 110 at this location is the M5TC model accelerometer from Pelton Land Energy System. This accelerometer has the dimensions of 4.00" (w)× 4.25" (l)×2.25" (h) and would be coupled to predrilled holes in the plate's top surface 112a.

D. Operation Using Local Sensor

Figure 10:
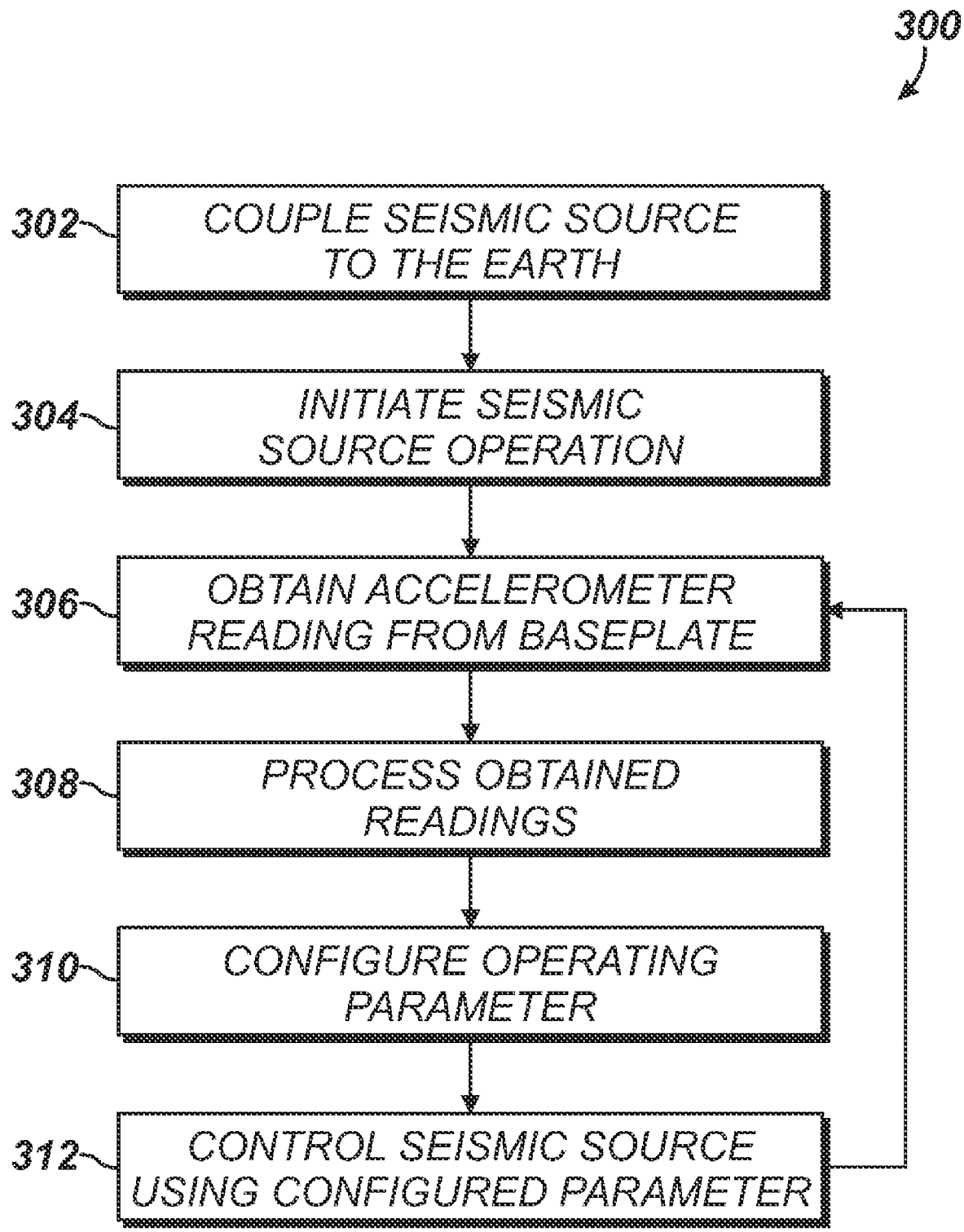
FIG. 10 is a flow chart illustrating operation of the disclosed vibrator.

Given the above description of the vibrator 100, base plate 110, and other components, discussion now turns to operation of the disclosed vibrator 100. FIG. 10 is a flow chart illustrating operation 300 of the disclosed vibrator 100 of FIGS. 4A-4C and 5. During operation 300, the seismic source 100 is coupled to the earth by using a lift mechanism on a truck to lower the source 100 with the frame 130 so that the base plate 110 engages the ground (Block 302).

With the base plate 110 properly positioned, operators then initiate seismic operation (Block 304). Here, the controller 200 configures the control signal for the servo valve assembly 180 having the desired bandwidth and sweep duration and controls the supply of hydraulic fluid to the piston 160 to produce the desired vibration of the mass 170 applied to the base plate 110 and ground. The seismic vibrator source signal is typically a sweep signal with a sinusoidal vibration ranging from 2-Hz to 100-Hz or 200-Hz and having a duration on the order of 2 to 20 seconds depending on the terrain, the subsurface lithology, etc.

During operation, the vibrator 100 produces the seismic source energy that is transmitted into the ground, reflected by subsurface interfaces, and detected by geophone receivers at the surface. Concurrently, the controller 200 obtains readings from the local base plate sensor 210 and the mass sensor 220 (Block 306). In addition, the controller 200 can obtain readings from additional sensors, such pressure sensors, etc.

The reading of the mass 170 is generally accurate because it does not undergo deflection or the like due to its size, mass, and dimensions. As noted previously, the local sensor 210 for the base plate 110 can be an accelerometer or the like that has been particularly located on the base plate 110 to obtain advantageous acceleration readings of the plate 110 as the mass 170 vibrates and transfers the vibration to the base plate 110. As discussed previously, these readings from the local sensor 210 in the preferred location 212 are more accurate than can be obtained from other locations because the location is unencumbered by other components (i.e., isolators, tension members, etc.) for the base plate 110. Furthermore, these readings from the local sensor 210 in the preferred location are more accurate because the preferred location experiences transition between longitudinal flexing along a length of the base plate during vibration and thereby better reflects the actual motion of the base plate 110 without added motion from the flexing and bending of the base plate 110.

The controller 200 processes the readings obtained from the sensors 210 and 220 (Block 308) and configures operating parameters for the vibrator 100 based on those readings (Block 310). In controlling the vibrator 100, the controller 200 may use a particular type of phase lock that locks the phase of the controller's control signal to the phase of the base plate 110, the reaction mass 170, the ground force, or the like.

For example, the controller 200 uses a reference or pilot signal to operate the vibrator 100 in a preferred manner having a particular duration, sweep frequencies, ground force, and the like. Based on that pilot signal, the controller 200 configures a drive signal to operate the vibrator 100 by controlling the hydraulic actuator. Phase locking the vibrator 100 to the ground force uses the signal from sensor 220 indicative of the acceleration of the reaction mass 170 and the signal from sensor 210 indicative of the acceleration of the base plate 110. Using these signals, the controller 200 computes a weighted-sum ground force exerted by the vibrator 100 on the ground. This weighted-sum ground force is calculated using a standard equation in the art that sums the momentum of the base plate 110 (mass value of base plate 110 multiplied by its acceleration) with the momentum of the reaction mass 170 (mass value of the reaction mass 170 multiplied by its acceleration).

Once configured, the controller 200 then controls the vibrator 100 with the newly configured parameters (Block 312). Then, using ground force phase lock, the controller 200 correlates the computed ground force's phase with the phase of the pilot signal to adjust the drive signal supplied to the vibrator 100. This correlation removes or reduces discrepancies between the ground force and pilot signal so that they are in phase or in sync with one another. This improves the operation of the vibrator 100, the imparted ground force, and the resulting seismic data in the various ways discussed herein.

E. Plots

As discussed previously, determining whether a weighted-sum ground force of a vibrator truly represents the vibrator's actual ground force remains a persistent issue in vibroseis technology. Freeing available space on the base plate 110 and particularly locating the accelerometer 210 at the preferred location 212 in this free space improves the operation of the disclosed vibrator 100 and the results it achieves, as noted previously. What follows is a discussion of these results.

Figure 11A:
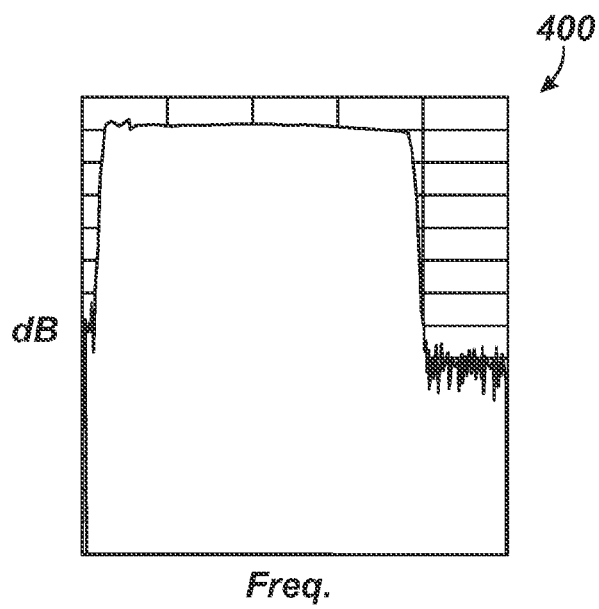
FIG. 11A is a plot showing a power spectrum for a weighted-sum ground force calculated for a prior art vibrator.
Figure 12A:
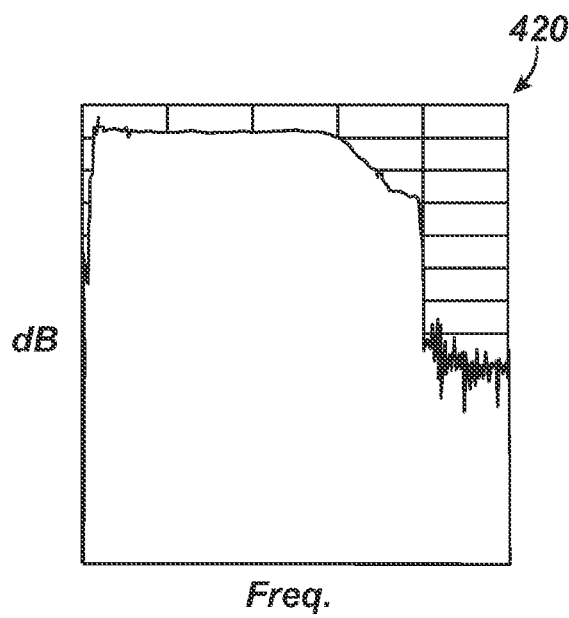
FIG. 12A is a plot showing a power spectrum for weighted-sum ground force calculated for a vibrator according to the present disclosure.

For comparison, a plot 400 in FIG. 11A shows the power spectrum for a weighted-sum ground force calculated for a prior art vibrator, while a plot 420 in FIG. 12A shows the power spectrum for a weighted-sum ground force calculated for a vibrator 100 according to the present disclosure. This plot 420 is based on the disclosed vibrator 100 having the base plate 110, preferred accelerometer location, and other features disclosed herein.

Figure 11B:
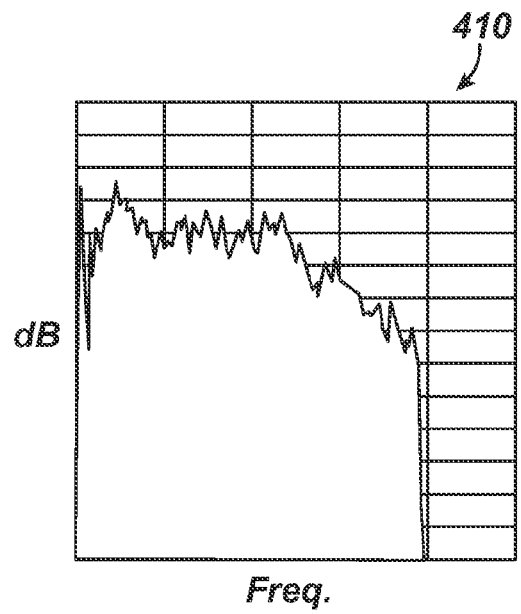
FIG. 11B is a plot showing an actual power spectrum of the prior art vibrator as measured from a depth of 1000-ft downhole.
Figure 12B:
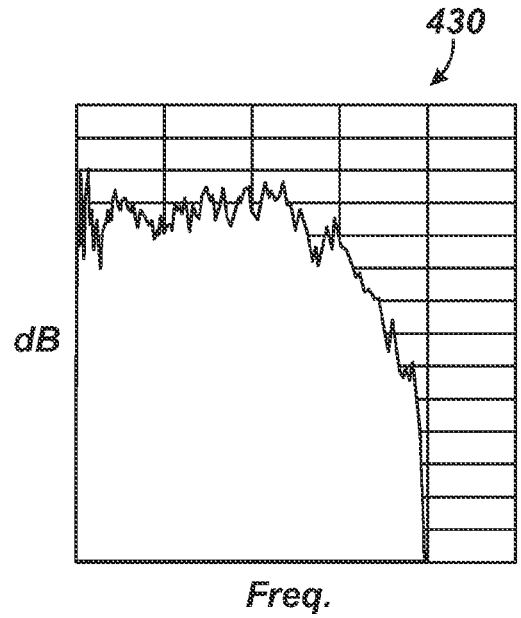
FIG. 12B is a plot showing an actual power spectrum of the disclosed vibrator as measured from a depth of 1000-ft downhole.

When comparing the power spectrums for the weighted-sum ground forces in the plots 400/420, it would appear that the prior art vibrator (FIG. 11A) performs better at high frequencies than the disclosed vibrator (FIG. 12A). However, when the downhole signals at 1000 feet deep are examined, it is clear that the signal for the disclosed vibrator 100 more closely resembles what is actually being input into the ground. In particular, an actual power spectrum 410 for the prior art vibrator is shown in FIG. 11B as measured from a depth of 1000-ft downhole. In contrast, FIG. 12B shows a plot of an actual power spectrum 430 for the disclosed vibrator as measured from a depth of 1000-ft downhole. As seen in these two plots, the disclosed vibrator's spectrum 430 has a higher power level as measured downhole than the prior art vibrator's spectrum 410.

During operation, the prior art vibrator apparently operates under the notion that it is doing a sufficient job of inputting a flat spectrum all the way up to 201-Hz as seen in FIG. 11A. In contrast, the disclosed vibrator 100 apparently recognizes that a limit has been reached in the vibrator's physical capability to input frequencies above about 150-Hz efficiently into the ground as evidenced by is power spectrum in the plot 420 of FIG. 12A dropping off somewhat. However, this strongly indicates that the disclosed vibrator's weighted-sum is more in agreement with the signal actually being input into the ground than is achieved by the prior art vibrator when the spectrums 410/430 are compared.

Figure 13A:
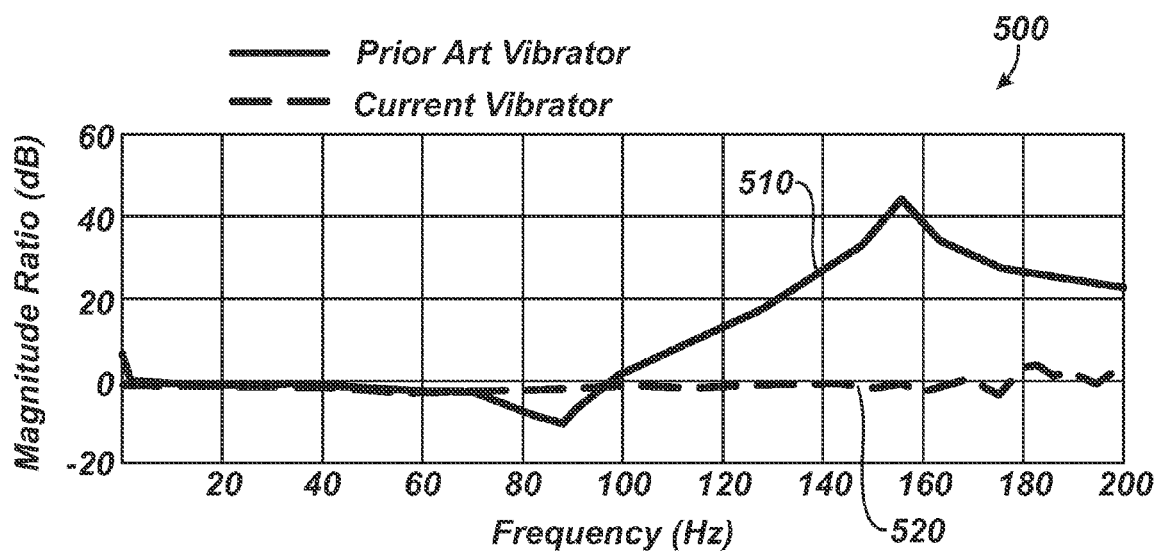
FIG. 13A shows a plot of the magnitude ratio (dB) relative to frequency (Hz) for a prior art vibrator compared to the disclosed vibrator.
Figure 13B:
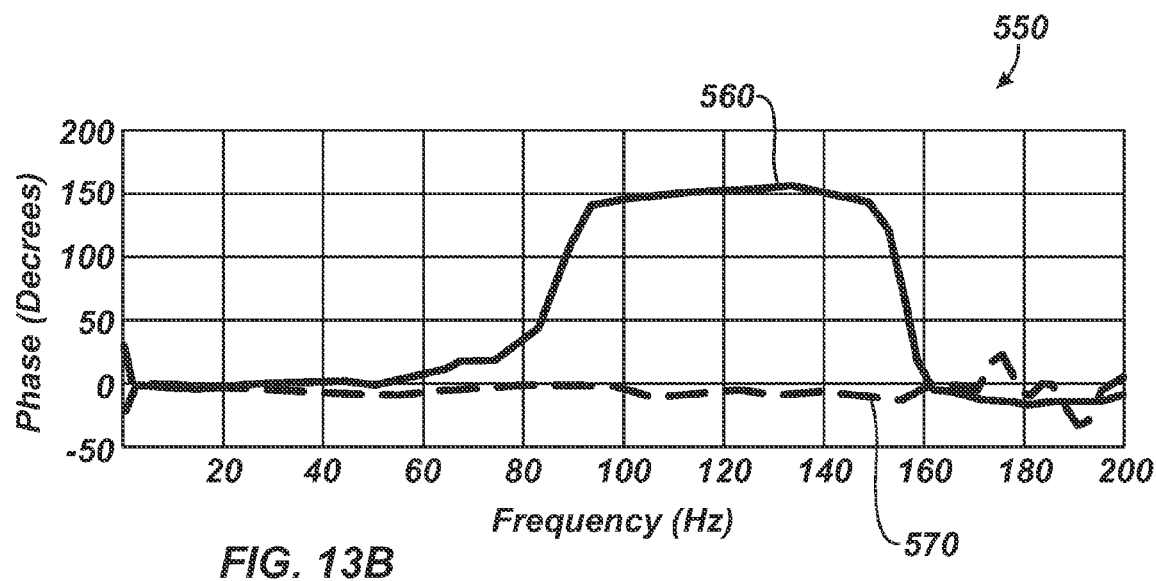
FIG. 13B shows a plot of the phase (degrees) relative to frequency (Hz) for a prior art vibrator compared to the disclosed vibrator.

The better agreement between the disclosed vibrator's weighted-sum ground force and the actual ground force is best illustrated in FIGS. 13A-13B. As shown in a plot 500 of FIG. 13A, a first curve 510 shows the magnitude ratio (dB) relative to frequency (Hz) for a prior art vibrator, and a second curve 520 shows the magnitude ratio (dB) relative to frequency (Hz) for the disclosed vibrator 100. These magnitude ratios compare the weighted-sum ground force computed for the vibrator to an actual force measured by a load cell during test operations. Comparison of these two curves 510/520 indicates that the disclosed vibrator produces a more steady magnitude ratio over the frequency range, showing that throughout the frequency range the disclosed vibrator's weighted-sum ground force computed during operation closely matches the actual ground force measured by the load cell. The prior art vibrator, however, apparently experiences increasing discrepancy in its computed weighted-sum ground force and the actual ground force at higher frequencies.

The same is true for the phase ratio of the disclosed vibrator. As shown in a plot 550 of FIG. 13B, a first curve 560 shows the phase ratio (degrees) relative to frequency (Hz) for a prior art vibrator, and a second curve 520 shows the phase ratio (degrees) relative to frequency (Hz) for the disclosed vibrator. Comparison of these two curves 560/570 indicates that the disclosed vibrator's phase during operation more closely matches the actual measured phase over the frequency range than is experienced by the prior art vibrator. Again, this confirms that using the disclosed vibrator 100 can offer a better agreement between the weighted-sum ground force and the actual ground force.

As discussed above, the base plate 110 with increase stiffness, the preferred location 212 of the accelerometer 210 on the base plate 110, and the other features disclosed herein help the disclosed vibrator 100 to produce a greater ground force and more bandwidth for seismic imaging over prior art vibrators. The stiffened base plate 110 and other features help in achieving this improved operation. Yet, even on its own, proper placement of the accelerometer 210 on the base plate 110 can improve operation.

Figure 1A:
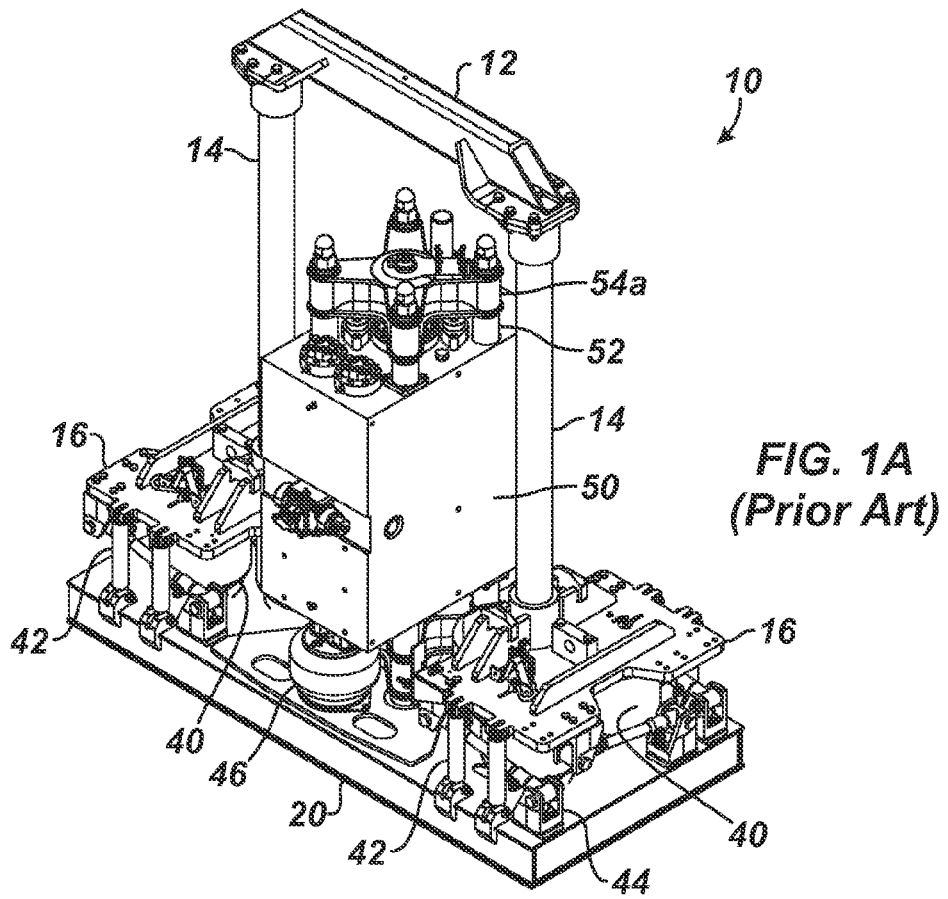
FIGS. 1A-1C show a vibrator according to the prior art in perspective, front, and top views.
Figure 1B:
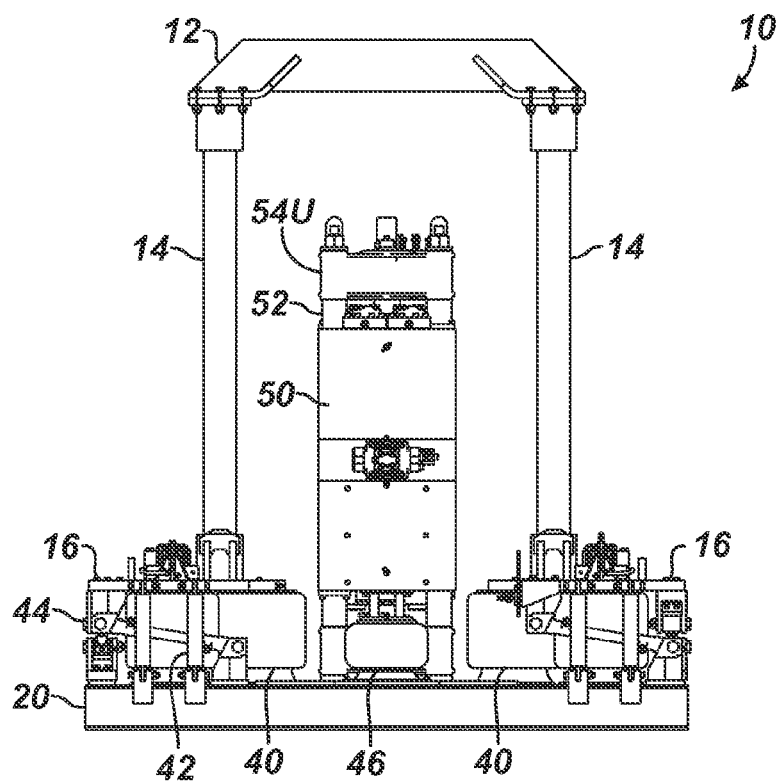
Figure 1C:
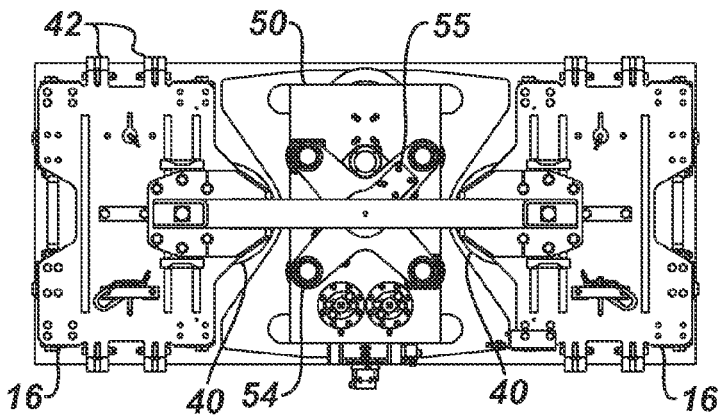
Figure 2:
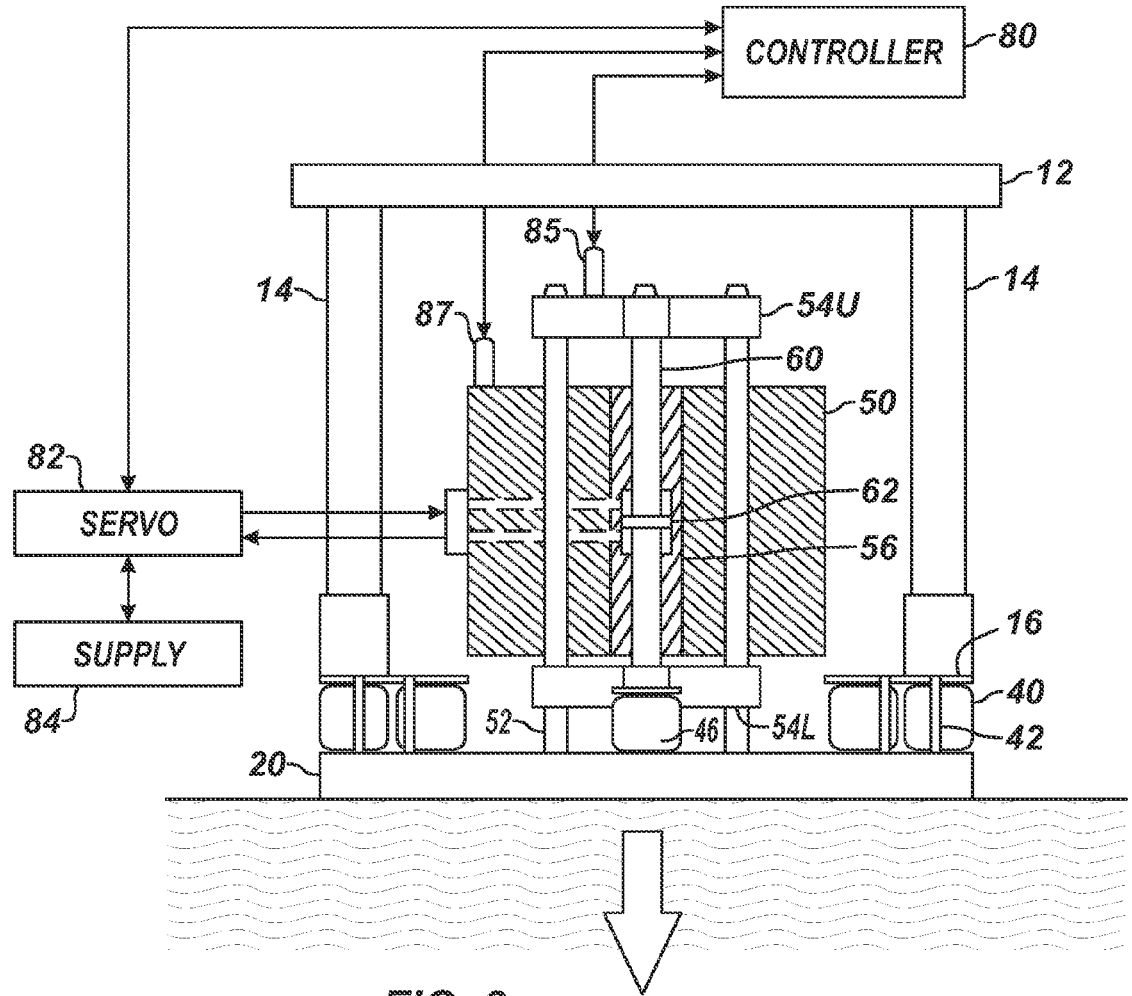
FIG. 2 schematically illustrates the prior art vibrator of FIGS. 1A-1C.
Figure 3A:
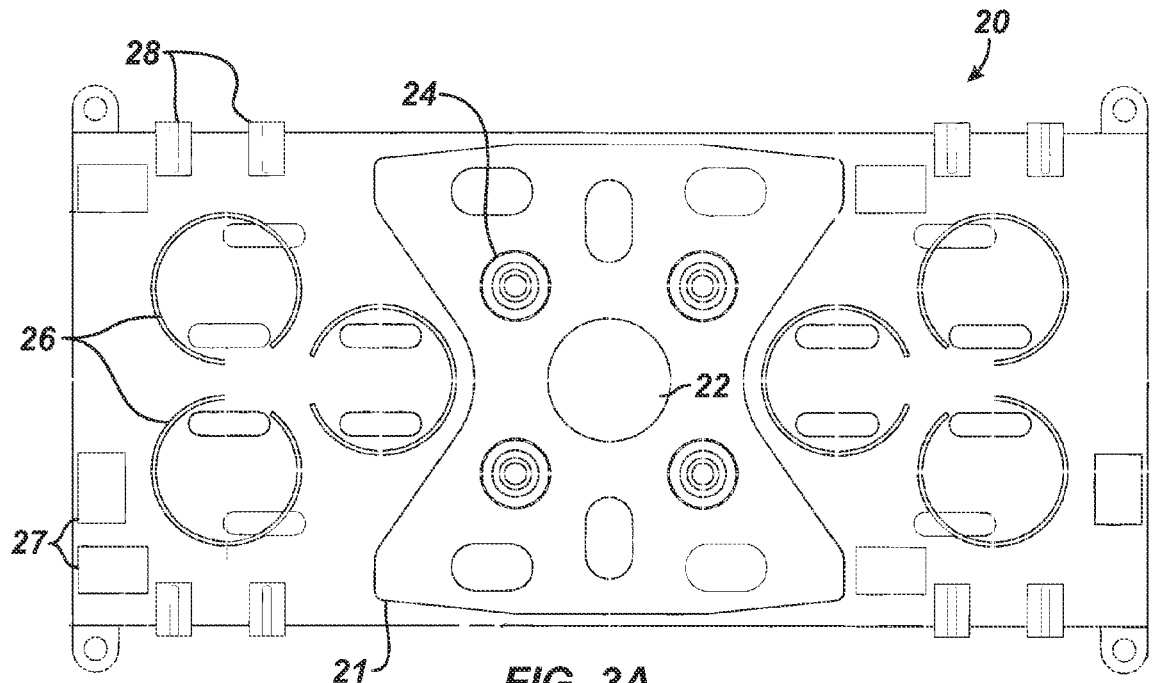
FIGS. 3A-3C illustrate the base plate for the prior art vibrator in plan, side, and end-section views.
Figure 3B:
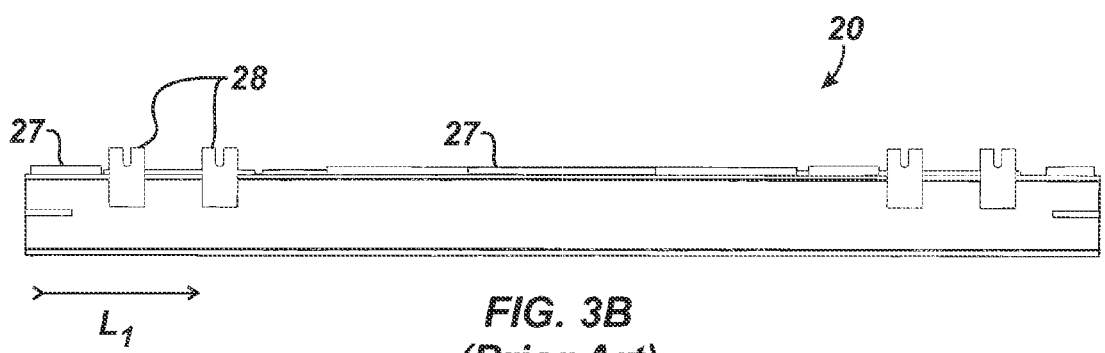
Figure 3C:
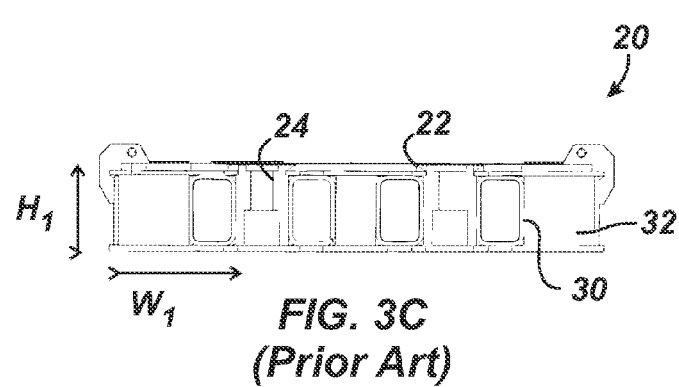
Figure 14:
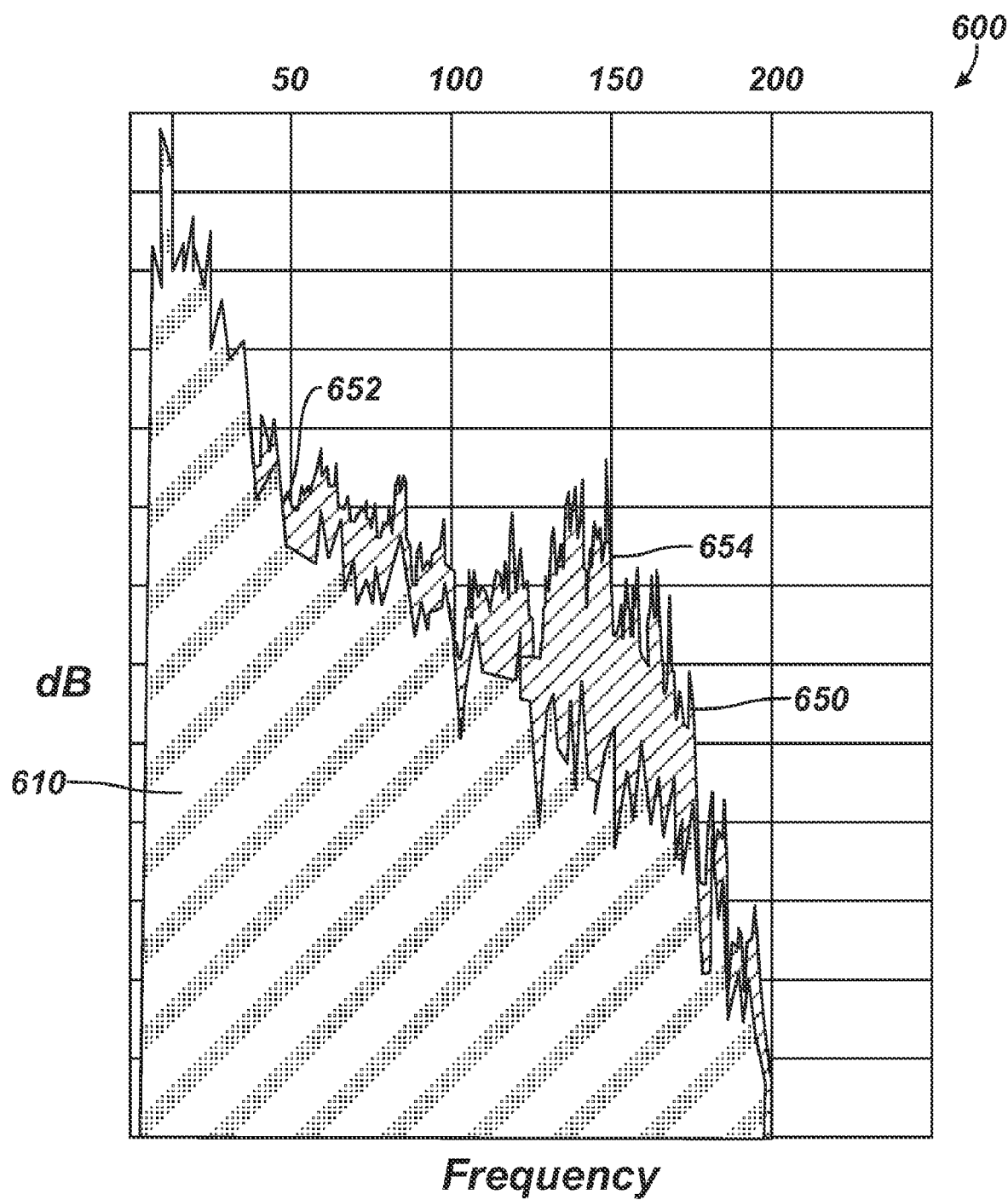
FIG. 14 is a plot showing a first frequency response of a prior art vibrator compared to the disclosed vibrator.

In FIG. 14, for example, a plot 600 shows a first power spectrum 610 for the disclosed vibrator 100 having the base plate 110 and other features disclosed herein but having an accelerometer disposed on the upper cross piece (145U; FIGS. 1A-1C) as done in the prior art. This first spectrum 610 is shown in comparison to a second power spectrum 650 for the disclosed vibrator 100 having the accelerometer 210 on the base plate 100 located in the preferred location 212 according to the present disclosure. The two vibrators for both spectrums 610/650 are operated using a sweep signal from 1-201-Hz over 20 seconds.

The first spectrum 610 shows a persistent decline in power (dB) with increased frequency. By contrast, the second spectrum 650 shows a more sustained response in the mid and higher frequencies. For example, the second spectrum 650 at 652 shows 3 dB at 50 Hz and declines less rapidly with increased frequency in comparison to the first spectrum 610. Additionally, the second spectrum 650 at 654 shows 14 dB at 150 Hz, which is significantly greater than the first spectrum 610 at this frequency. This indicates that locating the accelerometer 210 at the preferred location 212 on the base plate 110 improves the disclosed vibrator's power spectrum over positioning the accelerometer on the upper cross piece as conventionally done.

Although the disclosed vibrator 100 has been described with respect to a hydraulically actuated reaction mass, those skilled in the art will appreciate that the teachings of the present disclosure can be applied to other types of actuators for reciprocating a reaction mass. In general, therefore, the disclosed vibrator 100 can reciprocate a reaction mass using a linear induction motor, a linear synchronous motor, a controlled hydraulic actuator, or any other actuator used in the art. In addition to vibrating vertically, the disclosed vibrator 100 can also produce seismic shear waves ("S-Waves"). The present disclosure has focused on a single axis seismic source for brevity and without limiting the scope of the disclosure. Those skilled in the art would recognize that a multi-axis vibratory source capable of imparting both P and S waves into the earth can be configured according to the present disclosure. For example, details related to coupling the disclosed vibrator 10 to the earth and details related to other actuators for the disclosed vibrator 100 can be found in U.S. Pat. Pub. Nos. 2007/0250269, 2007/0240930, and 2009/0073807, which are incorporated herein by reference.

The foregoing description of preferred and other embodiments is not intended to limit or restrict the scope or applicability of the inventive concepts conceived of by the Applicants. In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A seismic vibrator comprising:
   An elongated base plate having a longitudinal axis;
   a mass movably disposed relative to the base plate for imparting vibrational energy thereto;
   an actuator coupled to the mass for moving the mass relative to the base plate;
   a first sensor disposed on the base plate and detecting first signals indicative of acceleration imparted to the base plate, the first sensor disposed at a location on the base plate experiencing transition between flexing along the longitudinal axis during vibration of the base plate; and
   a controller communicatively coupled to the actuator and the first sensor, the controller controlling the vibrator based at least in part on the first signals from the first sensor.

2. The vibrator of claim 1, wherein the first sensor is selected from the group consisting of a single axis accelerometer, a multiple axis accelerometer, a geophone, a micro electro-mechanical systems (MEMS) sensor, a digital accelerometer, and an analog accelerometer with an analog-to-digital converter.

3. The vibrator of claim 1, further comprising a second sensor disposed on the mass and detecting second signals indicative of acceleration of the mass.

4. The vibrator of claim 3, wherein the controller is communicatively coupled to the second sensor and computes a weighted-sum ground force based on acceleration values from the first and second signals and based on mass values for the mass and the base plate.

5. The vibrator of claim 1, wherein the actuator comprises:
   a servo valve controlled by the controller, and
   a piston disposed within the mass and hydraulically coupled to the servo valve.

6. The vibrator of claim 5, wherein the piston couples to a support disposed on the base plate, the support supporting the piston and the mass above the base plate.

7. The vibrator of claim 6, wherein the support comprises:
   a plurality of stilts affixed to the base plate and extending through the mass;
   a first cross piece supporting one end of the piston to the stilts; and
   a second cross piece supporting another end of the piston to the stilts.

8. The vibrator of claim 1, wherein the base plate comprises a plurality of beams disposed parallel to one another along the longitudinal axis, each of the beams having a height that is at least equal to or greater than 10% of a longitudinal length along which the beam bends during vibration of the base plate.

9. The vibrator of claim 1, further comprising a frame supporting the base plate relative to the ground and having at least four isolators isolating the frame from the base plate.

10. The vibrator of claim 9, wherein each of the at least four isolators is disposed at a corner location of the base plate and disposed offset from a footprint of the base plate.

11. The vibrator of claim 10, wherein the base plate comprises a plurality of shelves supporting the isolators, the shelves disposed at the corner locations and offset from the footprint.

12. The vibrator of claim 9, wherein the frame comprises first and second feet each disposed on one side of the mass and each isolated from the base plate by at least two of the isolators.

13. The vibrator of claim 9, wherein the frame comprises a plurality of tension members coupled between outside lateral edges of the base plate and outside edges of the first and second feet.

14. The vibrator of claim 9, wherein the frame comprises a plurality of shock absorbers coupled between a top surface of the base plate and bottom surfaces of the first and second feet, the shock absorbers disposed along edges of the base plate.

15. The vibrator of claim 1, wherein the base plate has a bottom surface defining a first footprint with a first area, and wherein the base plate has a top surface having regions being free from coupling to support components and being free from a second footprint of the mass, the regions defining a second area that is from about ½ to ⅔ of the first area.

16. The vibrator of claim 1, wherein the base plate has a longitudinal length, and wherein the first sensor is disposed at a longitudinal distance from a center of the longitudinal length, the longitudinal distance being about 41 to 43% of half of the longitudinal length of the base plate.

17. The vibrator of claim 16, wherein the base plate comprises a plurality of beams disposed parallel to one another along the longitudinal axis, each of the beams having a height that is at least equal to or greater than 10% of the longitudinal length of the base plate.

18. The vibrator of claim 16, wherein the first sensor is disposed on the longitudinal axis passing through the center of the base plate.

19. The vibrator of claim 1, wherein a first mass value for the mass is approximately three times greater than a second mass value for the base plate.

20. A seismic vibrator comprising:
an elongated base plate having a top surface and a bottom surface and having a longitudinal axis, the bottom surface coupleable to the ground;
a frame supporting the base plate relative to the ground and having at least four isolators isolating the frame from the base plate, each of the at least four isolators disposed at a corner location of the base plate and disposed offset from a first footprint of the bottom surface of the base plate;
a mass movably disposed above the base plate and imparting vibrational energy thereto;
an actuator coupled to the mass and moving the mass relative to the base plate;
a first sensor disposed on the base plate and detecting first signals indicative of acceleration imparted to the base plate, the first sensor disposed at a location of the base plate experiencing transition between flexing along the longitudinal axis during vibration of the base plate; and
a controller communicatively coupled to the actuator and the first sensor, the controller controlling operation of the vibrator based at least in part on the first signals from the first sensor.

21. A seismic source signal generation method comprising:
moving a reaction mass relative to an elongated base plate by actuating an actuator; imparting seismic energy from the base plate to the ground by imparting vibrational energy from the mass to the base plate;
obtaining a first acceleration reading from a first sensor disposed on the base plate, the first sensor disposed on a location of the base plate experiencing transition between flexing along a longitudinal axis of the base plate during vibration of the base plate; and
controlling the actuator based at least in part on the first acceleration reading.

22. The method of claim 21, further comprising:
obtaining a second acceleration reading from a second sensor disposed on the reaction mass; and
controlling the actuator based on the first and second acceleration readings.

23. The method of claim 22, wherein controlling the actuator comprises computing a weighted-sum ground force based on the first and second acceleration readings and based on mass values for the reaction mass and the base plate.

* * * * *